(12) United States Patent
Nugent et al.

(10) Patent No.: US 8,171,770 B2
(45) Date of Patent: May 8, 2012

(54) CALIBRATION TOOL FOR AIR DATA MEASUREMENT DEVICES

(75) Inventors: Mark R. Nugent, Torrance, CA (US); David I. Bass, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 701 days.

(21) Appl. No.: 12/212,430

(22) Filed: Sep. 17, 2008

(65) Prior Publication Data

US 2010/0064766 A1    Mar. 18, 2010

(51) Int. Cl.
*G01C 25/00*    (2006.01)
(52) U.S. Cl. .............................. 73/1.78; 73/1.16; 33/286
(58) Field of Classification Search ................... 73/1.78; 33/286, 645
See application file for complete search history.

(56) References Cited

U.S. PATENT DOCUMENTS

| | | | |
|---|---|---|---|
| 2,814,125 A * | 11/1957 | Hartwig | 33/228 |
| 2,814,960 A * | 12/1957 | Hahn | 76/5.1 |
| 3,633,212 A * | 1/1972 | Cooper | 346/107.2 |
| 3,816,935 A * | 6/1974 | Wilmot | 33/228 |
| 4,483,080 A * | 11/1984 | Knoll | 33/286 |
| 6,653,650 B2 * | 11/2003 | McMillan et al. | 250/559.3 |
| 2003/0041465 A1 * | 3/2003 | Brusius | 33/286 |
| 2003/0126923 A1 * | 7/2003 | Schulze | 73/170.14 |
| 2005/0035242 A1 | 2/2005 | Nugent et al. | |
| 2005/0241384 A1 * | 11/2005 | Stephens et al. | 73/167 |
| 2009/0048723 A1 | 2/2009 | Nugent et al. | |
| 2010/0132433 A1 * | 6/2010 | Tian et al. | 73/1.78 |

* cited by examiner

*Primary Examiner* — Hezron E Williams
*Assistant Examiner* — Nashmiya Fayyaz
(74) *Attorney, Agent, or Firm* — Novatech IP Law; Euclid Woo

(57) ABSTRACT

A calibration tool for an air data sensor of a vehicle comprises a target surface which is disposable on the vehicle. The calibration tool may further comprise a light pointer which is mountable on the air data sensor and which is operative to project a beam of light toward the target surface. The air data sensor may be configured as a flow direction sensor which may include at least one of an alpha vane for measuring angle of attack or a beta vane for measuring sideslip. The flow direction sensor may be mountable in spaced relation to the vehicle via a standoff. The flow direction sensor may include a hollow pivot arm having a laser pointer mounted therewithin for projecting a beam of laser light onto the target surface.

20 Claims, 3 Drawing Sheets

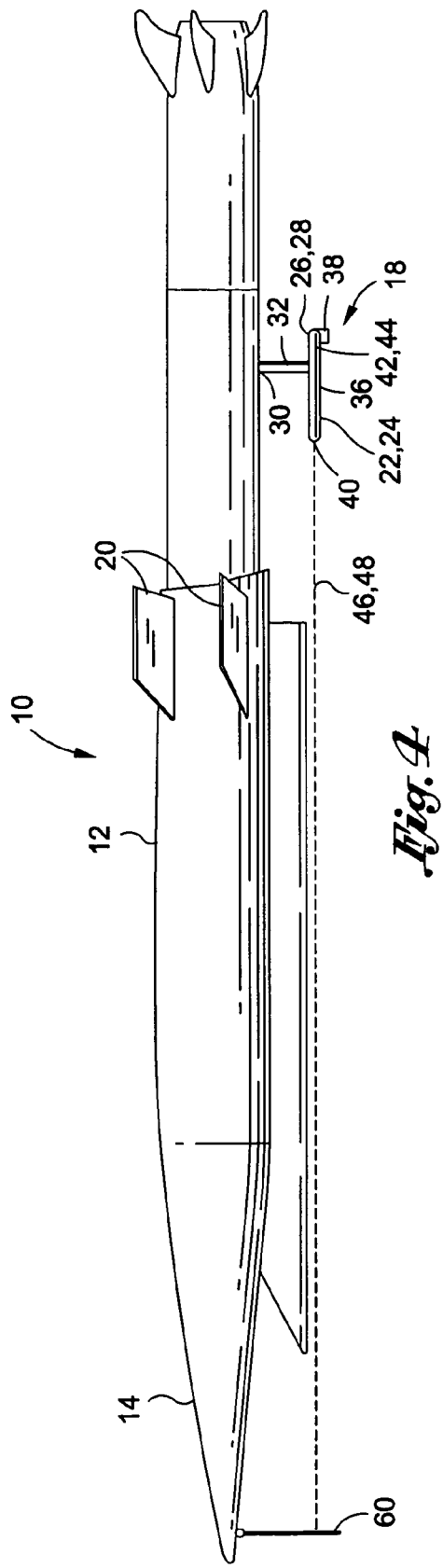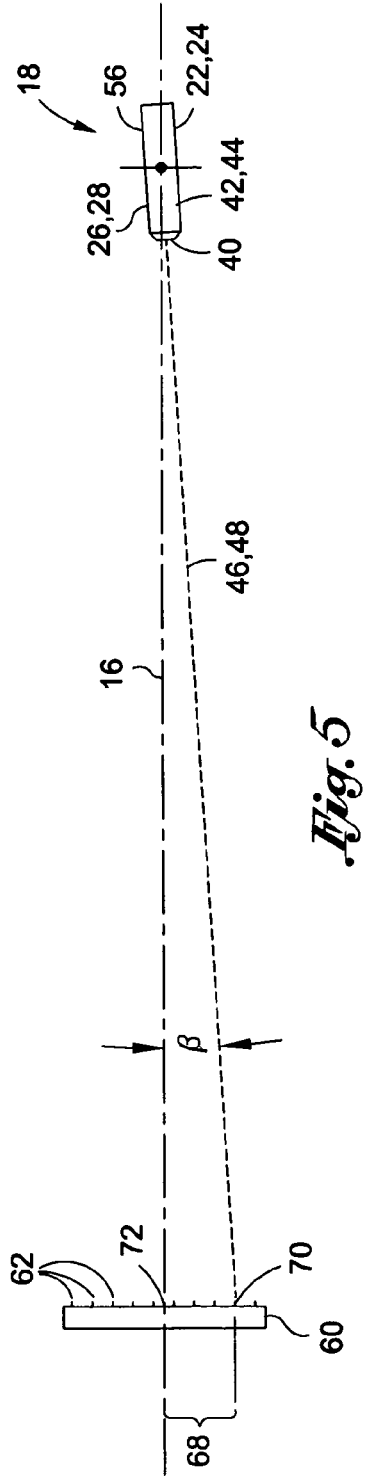

CALIBRATION TOOL FOR AIR DATA MEASUREMENT DEVICES

STATEMENT RE: FEDERALLY SPONSORED RESEARCH/DEVELOPMENT

This invention was made with Government support under Contract No. F33615-03-9-2422/P000 awarded by the Air Force. The government has certain rights in this invention.

CROSS-REFERENCE TO RELATED APPLICATIONS (Not Applicable)

FIELD

The present invention relates generally to air data measurement and calibration and, more particularly, to a self-contained, low-power calibration tool for air data measurement devices.

BACKGROUND

Aircraft typically include a variety of air measurement devices and air data sensors for measuring various parameters associated with air flow. For example, air data sensors may measure airspeed, air pressure, altitude, air temperature as well as local air flow angles as the aircraft disturbs the air that it flies through. Measured flow angles may include angle of attack and angle of sideslip.

Air data sensors such as alpha vanes and beta vanes are commonly used for measuring local flow angles such as angle of attack and angle of sideslip. Resembling small weather vanes having a pivot arm that pivots into the airflow, alpha and beta vanes are mounted on strategic areas of the aircraft such as on a boom extending outwardly from a wing leading edge or nose of the aircraft. Alpha and beta vanes may be coupled to a potentiometer or other device which generates an electrical signal that varies in proportion to angular displacement of the alpha or beta vane in response to local flow about the aircraft.

Accurate measurements of angle of attack and angle of sideslip are necessary for safe operation of the aircraft as such air data is provided to flight control computers to facilitate control of the aircraft. In this regard, air data sensors must be calibrated such that the true angle of attack and true angle of sideslip of the aircraft can be provided to flight instrumentation and flight computers.

Conventional methods for calibrating air data sensors include leveling fixtures and tooling which, although satisfactory for their intended purposes, possess certain drawbacks which detract from their overall utility. For example, conventional leveling fixtures and tooling are typically adapted to fit specific types of air data sensors and may be unique to each vehicle and location. Such fixtures and tooling must be temporarily installed on the alpha or beta vanes or the fixtures may be mounted on the air data boom in a time-consuming process. After mounting of the tooling and/or fixtures, calibration operations are performed and the fixtures and tooling must then be removed and stored for later use.

A further drawback associated with conventional calibration methods is the amount of time required for calibrating each air data sensor. Such fixtures and tooling must be carefully installed and checked for alignment with a desired axis of the aircraft so that the flight instrumentation may receive accurate information regarding the true air flow parameters.

Another drawback associated with conventional fixtures for calibrating air data sensors is related to the limited accuracy of such fixtures. For example, one commercially-available calibration fixture comprises a visual scale that is mounted directly on the air data boom and is aligned with a fin on the pivot arm to allow calibration of the alpha or beta vane. Unfortunately, due to the relatively short length of the pivot arm of the air data sensor, the accuracy of calibration is limited. As a result, the accuracy with which a directional air data sensor measures air flow direction may result in the delivery of inaccurate data.

BRIEF SUMMARY

The above-described deficiencies associated with prior art calibration tools for air measuring devices are specifically addressed and alleviated by a calibration tool as disclosed herein. In a broad sense, the calibration tool comprises a light pointer which is integrated with or mountable to an air data sensor such as a flow direction sensor. The flow direction sensor may comprise any suitable device for measuring local flow angles such as an alpha vane for measuring angle of attack or a beta vane for measuring angle of sideslip. The light pointer is mountable on the air data sensor and is operative to project a beam of light toward a target surface also mountable on the aircraft and which permits visualization and/or measurement of any offset or misalignment of the flow direction sensor.

The technical effects of the disclosure include a self-contained calibration tool which eliminates the need for separate additional calibration fixtures such as prior art leveling tools and fixtures which must be temporarily mounted to the aircraft during assembly in order to calibrate air data measurement devices and which must be removed after each calibration procedure. As such, the calibration tool as disclosed herein reduces the time required to install and align air data sensors on a vehicle and reduces the time required to periodically calibrate and adjust such air data sensors during the operating life of the aircraft.

The light pointer of the calibration tool may be mountable to a pivot arm of the air data sensor and is operative to project the light beam toward the target surface. In one embodiment, the light pointer may be configured as a laser pointer for projecting a laser beam toward the target surface from an optical opening formed in a forward end of the pivot arm. The pivot arm is preferably hollow in order to allow mounting of the laser pointer or light pointer therewithin.

The target surface is preferably mounted in spaced relationship to the laser pointer in order to maximize the accuracy by which the air data sensor may be calibrated. The target surface is preferably of an opaque or translucent nature in order to permit visual observation of an amount of offset between a projection of the laser beam onto the target surface and a theoretical center which is preferably in alignment with a reference axis of the aircraft such as the lateral axis.

The target surface may optionally include a plurality of grid marks in order to facilitate visual observation the offset. The amount of offset may be correlated to a calibration factor that may be applied to electrical signals generated by a potentiometer or other signal generating device of the flow direction sensor. Alternatively, the offset may be an indication of the amount of adjustment that may be applied during initial installation of the flow direction sensor such that the pivot arm may be aligned with the reference axis of the aircraft.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These as well as other features of the present invention will become more apparent upon reference to the drawings wherein like numbers refer to like parts throughout and wherein:

FIG. 4 is a side view of the vehicle illustrating the calibration tool integrated with the air data sensor and projecting the light beam to the target surface; and FIG. 5 is a schematic illustration of an angular offset of the laser beam relative to a lateral axis of the vehicle.

DETAILED DESCRIPTION

Figure 1:
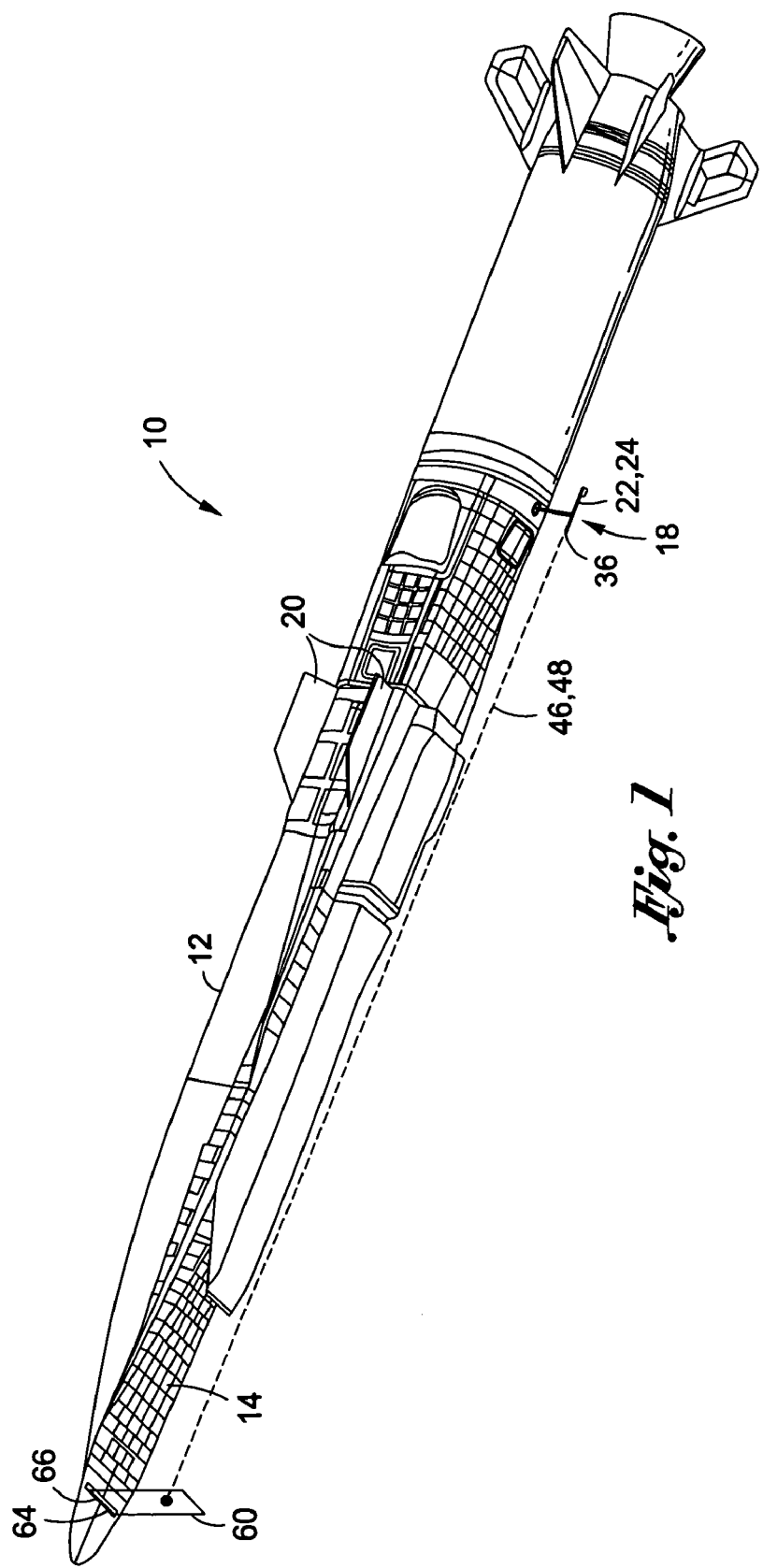
FIG. 1 is a perspective illustration of a vehicle having a calibration tool mounted thereon for calibrating an air data sensor.

Referring now to the drawings wherein the showings are for purposes of illustrating preferred embodiments of the disclosure and not for purposes of limiting the same, FIG. 1 illustrates a vehicle 10 such as an aircraft 12 having a calibration tool 18 for an air data sensor 22 mounted thereto. The calibration tool 18 may comprise a light pointer 42 or laser pointer 44 for aligning the air data sensor 22 when the air data sensor 22 is initially installed on the aircraft 12. In addition, the calibration tool 18 may facilitate periodic checking of the alignment of the air data sensor 22 and adjusting the orientation thereof relative to a reference feature such as the lateral axis 16 of the aircraft 12. Although typically pivotable about a single axis, the air data sensor 22 may be provided in an embodiment that may be pivotable about multiple axes such that the light pointer 42 may facilitate adjusting the orientation of the air data sensor 22 relative to the multiple axes.

The calibration tool 18 may facilitate calibrating the air data sensor 22 by measuring a misalignment or offset 68 of the air data sensor 22 as shown in FIG. 5 such that the mounting position of the air data sensor 22 may be adjusted or such that correction factors may be applied to measurements obtained by the air data sensor 22 during normal operation of the air data sensor 22. In addition to the embodiments illustrated in FIGS. 1-5, the air data sensor 22 may comprise any number of different configurations, sizes and shapes. For example, as shown in FIGS. 1-5, the air data sensor may be configured as a flow direction sensor 24 to measure angle of sideslip β, angle of attack, or other flow parameters.

Figure 2:
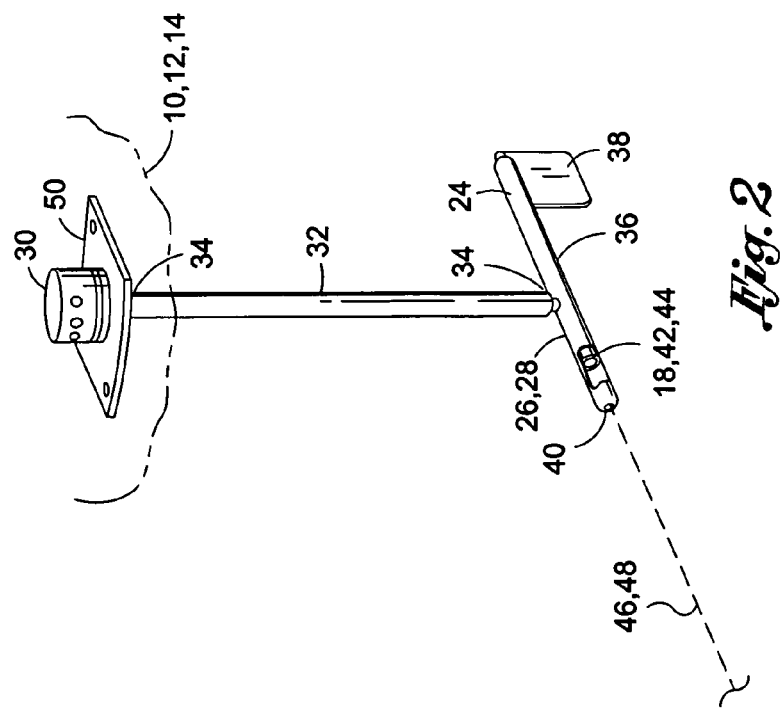
FIG. 2 is an enlarged perspective illustration of the calibration tool in an embodiment wherein the calibration tool is integrated into the air data sensor which may be configured as a beta vane having a light source disposed within a pivot arm of the beta vane.

Referring particularly to FIGS. 1 and 2, the calibration tool 18 may be integrated with or mounted to the flow direction sensor 24 which is shown in one embodiment attached to an underside of a fuselage 14 of the aircraft 12 such as via a mount 50. However, it should be noted that the flow direction sensor 24 may be mounted at any location on any vehicle 10 and is not limited to the specific aircraft 12 installation shown in the Figures.

In a broad sense, the calibration tool 18 may comprise a light pointer 42 for emitting a light beam 46 for projection onto a target surface 60. In a preferred embodiment, both the light pointer 42 and target surface 60 are mountable on or removably attachable to the aircraft 12 in order to provide a self-contained calibration tool 18 which eliminates the need for additional leveling tools and other calibration fixtures which must be temporarily mounted and then removed each time a calibration is performed.

The calibration tool 18 in combination with the air data sensor 22 advantageously reduces the time and complexity of air data sensor 22 installations. Furthermore, the calibration tool 18 reduces the time required for pre-flight operations wherein the alignment and integrity of air data sensors 22 may be checked. In this regard, by incorporating the calibration onto the air data sensor, a reduction in labor and cost can be realized in vehicle assembly, flight operations and flight test.

FIG. 1 illustrates the flow direction sensor 24 configured as a beta vane 28 for measuring angle of sideslip β. However, as mentioned above, the flow direction sensor 24 may likewise be configured as an alpha vane 26 for measuring angle of attack of an aircraft 12 such that the structural and functional features and advantages of the calibration tool 18 as described herein are equally applicable to an alpha vane 26 or other directional air data sensor.

As can be seen in FIGS. 1-5, the flow direction sensor 24 may be mounted in spaced relation to the vehicle 10 such as via a standoff or strut 32 extending laterally outwardly from the fuselage 14 of the aircraft 12. The beta vane 28 may be comprised of a pivot arm 36 pivotally coupled to the strut 32 and rotatably mounted thereto via at least one and, more preferably, a pair of bearing 34 assemblies which may be disposed with the strut 32. The pivot arm 36 may be configured as an elongate member having an axis that is preferably installed in alignment with a reference axis (e.g., a lateral axis 16) of the aircraft 12 with the aid of the calibration tool. The pivot arm 36 may include at least one fin 38 for maintaining the pivot arm 36 in alignment with the local flow via weathervane action.

As was earlier mentioned, the pivot arm 36 is preferably rotatably coupled to the strut 32 via at least one bearing 34 and may be directly or indirectly coupled to a potentiometer 30 of the air data sensor. As shown in FIG. 2, the potentiometer 30 may generate electrical signals representative of the amount of angular offset 68 of the pivot arm 36 relative to the vehicle. Alternatively, the flow direction sensor 24 may include other devices for measuring angular position of the pivot arm 36. For example, the flow direction sensor 24 may be coupled to a synchronizer or a resolver in order to provide an electrical signal indicating air flow direction.

The calibration tool 18 may include the light pointer 42 which is mountable on the air data sensor 22 and, in one configuration, is preferably integrated into a hollow interior of the pivot arm 36. The light pointer 42 may be configured as a laser beam 48 in order to project a beam of light such as a laser beam 48 toward the target surface 60. The hollow pivot arm 36 preferably has an optical opening 40 on an end opposite the fin 38 to permit projection of the laser beam 48 out of the pivot arm 36.

Referring still to FIGS. 1-5, the calibration tool 18 may further comprise the target surface 60 which is disposable on the vehicle 10 and, in a preferable embodiment, is removably mountable to the vehicle. In this regard, the target surface 60 may include a hinge 64 to allow pivoting of the target surface 60 about a hinge line such that the target surface 60 may pivot downwardly from a stowed position into a deployed position. In an alternative embodiment, the target surface 60 may be configured to extend outwardly through an aperture 66 formed in the vehicle 10 from a retracted position to the deployed position. In a further alternative embodiment, the target surface 60 may be temporarily attached to the vehicle during the performance of calibration procedures after which the target surface 60 may be removed from the vehicle 10.

Figure 3:
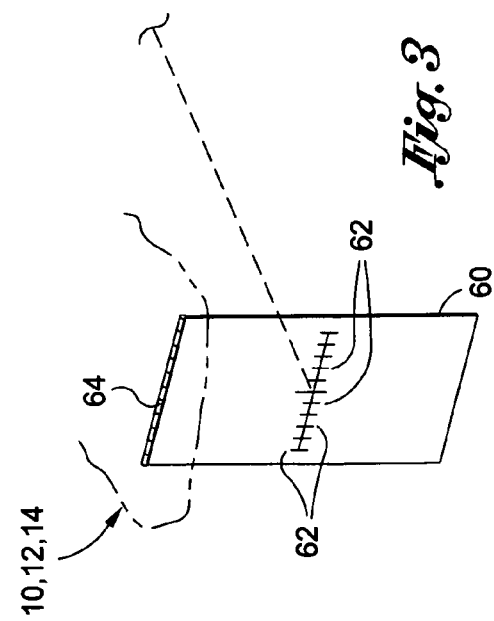
FIG. 3 is an enlarged perspective illustration of a target surface of the calibration tool and which may be configured to be mountable to the vehicle.

As shown in FIGS. 3 and 5, the target surface 60 may optionally include at least one and, more preferably, a plurality of grid marks 62 which are preferably aligned in a horizontal orientation in order to permit visual observation of the light beam 46 on the target surface 60. However, other indicia may be included on the target surface 60 and in different configurations other than that which is shown in FIGS. 3 and 5.

Although the calibration tool 18 is preferably comprised of a laser beam 48 for emitting a laser light for projection onto the target surface 60, it should be noted that any light source which is capable of emitting a narrow, low-divergence beam may be used for projecting the beam of light onto the target surface 60. In this regard, the light beam 46 is not necessarily limited to a narrow beam of light but may comprise any beam of light that may be projected onto the target surface 60 to allow for observation and/or measurement of an amount of offset 68 of the light beam 46 from a theoretical position such as the lateral axis 16.

Referring particularly now to FIG. 5, shown is a schematic illustration of the angular orientation of the light beam 46 or laser beam 48 in relation to the lateral axis 16 of the aircraft 12. It can be seen that the laser beam 48 is projected onto the target surface 60 at an offset 68 from a theoretical center which may be coincident with the lateral axis 16 of the aircraft 12. Such offset 68 corresponds to an angle of sideslip β of the aircraft 12. In this regard, during calibration of the flow direction sensor, the orientation thereof relative to the fuselage 14 may be adjusted based upon the amount of offset 68 between the laser beam 48 and the lateral axis 16 of the aircraft 12.

In an alternative embodiment, the calibration of the flow direction sensor 24 may comprise correlation of the amount of offset 68 to the electrical signal generated by the flow direction sensor 24 and which is representative of the angular orientation of the flow direction sensor 24 relative to the aircraft 12. In this regard, a calibration factor or correction factor may be derived for implementation into a look-up table for use by an air data computer or flight computer in determining true aircraft orientation.

The target surface 60 is preferably configured to have a flat surface at least on a side of the target surface 60 that faces the light beam 46 or laser beam 48. In addition, the target surface 60 is preferably oriented in perpendicular arrangement relative to the lateral axis 16 for accurate measurement of offset 68. Furthermore, the target surface 60 is preferably opaque or translucent at least in the area where the light beam 46 or laser beam 48 is projected in order to facilitate visual observation of the amount of offset 68 of the projected position 70 relative to a desired position 72 such as relative to the lateral axis 16 of the aircraft 12. In an alternative embodiment, the target surface 60 may include optical sensors (not shown) to optically sense the offset 68 of the projection of the laser beam 48 onto the target surface 60. In this manner, the offset 68 may be electronically measured at the target surface 60 and may be provided to a flight control computer in order to calibrate or adjust for measurements by the flow direction sensor 24.

The operation of the calibration tool 18 will now be described with reference to FIGS. 1-5. The method for calibrating the air data sensor 22 may comprise mounting the air data sensor 22 to a vehicle 10 such as the aircraft 12 illustrated in FIG. 1. In addition, the target surface 60 may preferably be removably mounted to the vehicle 10 in any convenient manner such as pivotably mounting and/or by mounting to permit extension and retraction of the target surface 60 relative to the aircraft 12.

For example, as shown in FIG. 1, an aperture 66 may be provided in the aircraft 12 in order to permit extension of the target surface 60 out of the fuselage 14 during use and permitting retraction of the target surface 60 back into the fuselage 14 when the target surface 60 is no longer required. It should be noted that regardless of the manner in which it is deployed, the target surface 60 is preferably positioned at a maximum distance away from the air data sensor 22 in order to increase the accuracy of calibration of the air data sensor.

Operation of the calibration tool 18 further comprises the steps of activating the laser pointer 44 or light pointer 42 in order to cause the projection of the light beam 46 or the laser beam 48 onto the target surface 60 in a manner as illustrated in FIG. 5. Upon projection of the light beam 46 and/or laser beam 48 onto the target surface 60, the air data sensor 22 may be adjusted relative to its mounting position on the aircraft 12 such that the light beam 46 or laser beam 48 is moved into alignment with the lateral axis 16 or other reference axis of the aircraft 12.

Alternatively, the calibration process may comprise measuring an amount of offset 68 of the projected laser beam 48 onto the surface relative to a theoretical center or desired position 72 such as at an intersection of the lateral axis 16 with the target surface 60. The amount of offset 68 may be applied to the electrical signal representative of the angular orientation of the air data sensor. As was earlier mentioned, such electrical signal may be produced by the potentiometer 30 or other suitable angular measurement device of the air data sensor.

The calibration tool 18 may be used for alignment of the flow direction sensor 24 during installation of the flow direction sensor 24 on the aircraft 12. In addition to assembly operations, the calibration tool 18 may be used to periodically check the alignment of the flow direction sensor 24. In this regard, the target surface 60 may be deployable after a predetermined number of flights or operating hours or other parameter wherein the alignment of the light beam 46 may be checked and calibrated in relation to a reference axis or reference position such as the lateral axis 16 of the aircraft 12.

In a further embodiment, the calibration tool 18 may be integrated with or disposed on any air data sensor 22 installation where there is relative pivoting motion between two or more objects such as the pivoting motion of a control surface (e.g., rudder, aileron, etc.) relative to another component such as a vertical fin 38 or a wing 20. In this regard, the calibration tool 18 may facilitate checking of the alignment of the control surface during installation and periodically during the operating life of the aircraft 12 such as during pre-flight. In this regard, the calibration tool 18 may be operative to measure pivoting motion of the control surface relative to a fixed surface to which the control surface may be mounted.

The above description is given by way of example and not limitation. Given the above disclosure, one skilled in the art could devise variations that are within the scope and spirit of the embodiments disclosed herein. Furthermore, the various features of the embodiments disclosed herein can be used alone or in any varying combinations with each other and are not intended to be limited to the specific combinations described herein. Thus, the scope of the claims is not to be limited by the illustrated embodiments.

What is claimed is:

1. A calibration tool for an air data sensor mounted to a vehicle, comprising:
   a target surface disposable on the vehicle; and a light pointer mountable to a pivot arm of the air data sensor and being operative to project a light beam toward the target surface;

the pivot arm being rotatably movable relative to the vehicle following installation and adjustment of the air data sensor on the vehicle;

the air data sensor being adjustable in correspondence to an angular offset of the light beam relative to a desired position on the target surface, the adjustability of the air data sensor including at least one of adjusting an orientation of the air data sensor and calibrating the air data sensor.

2. The calibration tool of claim 1 wherein:
the target surface is removably mountable to the vehicle.

3. The calibration tool of claim 1 wherein:
the air data sensor is configured as a flow direction sensor.

4. The calibration tool of claim 3 wherein:
the flow direction sensor is configured as at least one of an alpha vane and a beta vane.

5. The calibration tool of claim 3 wherein:
the flow direction sensor is mountable in spaced relation to the vehicle;

the pivot arm being hollow and having the light pointer mounted therewithin.

6. The calibration tool of claim 1 wherein:
the target surface includes at least one grid mark for visual observation of the light beam projected onto the target surface.

7. The calibration tool of claim 1 wherein:
the light pointer is a laser pointer configured to emit a laser beam.

8. An aircraft, comprising:
a calibration tool for an air data sensor mounted to a vehicle, including:
a target surface disposable on the vehicle; and
a light pointer mountable to a pivot arm of the air data sensor and being operative to project a light beam toward the target surface;
the pivot arm being rotatably movable relative to the vehicle following installation and adjustment of the air data sensor on the vehicle;
the air data sensor being adjustable in correspondence to an angular offset of the light beam relative to a desired position on the target surface, the adjustability of the air data sensor including at least one of adjusting an orientation of the air data sensor and calibrating the air data sensor.

9. The aircraft of claim 8 wherein:
the air data sensor is configured as a flow direction sensor.

10. The aircraft of claim 9 wherein:
the flow direction sensor is configured as at least one of an alpha vane and a beta vane.

11. The aircraft of claim 9 wherein:
the flow direction sensor is mountable in spaced relation to the vehicle;
the pivot arm being hollow and having the light pointer mounted therewithin.

12. The aircraft of claim 8 wherein:
the target surface includes at least one grid mark for visual observation of the light beam projected onto the target surface.

13. The aircraft of claim 8 wherein:
the light pointer is a laser pointer configured to emit a laser beam.

14. The aircraft of claim 9 wherein:
the flow direction sensor is operative to generate an electrical signal representative of angular movement of the pivot arm, the flow direction sensor including:
a potentiometer operatively coupled to the pivot arm and being configured to vary the electrical signal in proportion to the angular movement.

15. The aircraft of claim 8 further comprising:
a fuselage; and
a wing.

16. A method of calibrating an air data sensor having a laser pointer, comprising the steps of:
mounting the air data sensor to a vehicle, the air data sensor having a pivot arm;
mounting the laser pointer to the pivot arm;
mounting a target surface to the vehicle such that the target surface is disposed in spaced relation to the air data sensor;
activating the laser pointer such that a laser beam is projected onto the target surface at a projected position; and
adjusting the air data sensor based upon the projection of the laser beam onto the target surface by performing at least one of the following:
adjusting an orientation of the air data sensor; and
calibrating the air data sensor;
the pivot arm being rotatably movable relative to the vehicle following the mounting and the adjustment of the air data sensor.

17. The method of claim 16 wherein the vehicle defines a lateral axis, the step of adjusting the orientation of the air data sensor comprising the step of:
adjusting the orientation of the air data sensor such that the laser beam is aligned with the lateral axis.

18. The method of claim 16 wherein the air data sensor is operative to generate an electrical signal representative of the angular position of the air data sensor, the step of calibrating the air data sensor comprising the steps of:
locating a desired position of the laser beam on the target;
measuring an offset between the projected position and the desired position; and
correlating the offset to the electrical signal representative of an angular position of the air data sensor.

19. The method of claim 16 wherein:
the air data sensor is configured as a flow direction sensor.

20. The method of claim 19 wherein:
the flow direction sensor is configured as at least one of an alpha vane and a beta vane.

* * * * *